United States Patent
Schwarz et al.

[11] Patent Number: 5,903,479
[45] Date of Patent: May 11, 1999

[54] METHOD AND SYSTEM FOR EXECUTING DENORMALIZED NUMBERS

[75] Inventors: Eric Mark Schwarz, Gardiner; Bruce Giamei, Poughkeepsie; Christopher A. Krygowski; Mark Anthony Check, both of Hopewell Junction; John Stephen Liptay, Rhinebeck, all of N.Y.

[73] Assignee: International Business Machines Corporation, Armonk, N.Y.

[21] Appl. No.: 08/922,191

[22] Filed: Sep. 2, 1997

[51] Int. Cl.$^6$ ........................................................ G06F 5/01
[52] U.S. Cl. .................................. 364/715.04; 364/748.04
[58] Field of Search ........................... 364/748.04, 715.04

[56] References Cited

U.S. PATENT DOCUMENTS

| | | | |
|---|---|---|---|
| 5,058,048 | 10/1991 | Gupta et al. | 364/748 |
| 5,602,769 | 2/1997 | Yu et al. | 364/748 |
| 5,646,875 | 7/1997 | Taborn et al. | 364/715.04 |

OTHER PUBLICATIONS

"Floating Point Exception Handling (Denormalization)" *IBM Technical Disclosure Bulletin* vol. 33 No. 9 Feb. 1991 pp. 345–348.

"Corrective Rounding on a Denormalized IEEE Floating Point Result which was Rounded as Normalized", by Fagat et al., Research Disclosure n350, Jun. 1993, Disclosure No. RO8920612.

"Single Cycle/Writeback Cycle Floating Point Denormalization" by Elliott et al., IBM Technical Disclosure Bulletin, vol. 37, No. 4B, Apr. 1994, pp. 315–318.

*Primary Examiner*—David H. Malzahn
*Attorney, Agent, or Firm*—Lynn L. Augspurger

[57] ABSTRACT

A method and system for processing instructions in a floating point unit for executing denormalized numbers in floating point pipeline via serializing uses an instruction unit and having a control unit and a pipelined data flow unit, a shifter and a rounding unit. The floating point unit has an external feedback path for providing intermediate result data from said rounding unit to an input of the pipelined data flow unit to reuse the pipeline for denormalization by passing intermediate results in the pipeline which have a denormalized condition computed after the exponent calculation of the shifting circuit directly from the rounding unit to the top of the dataflow in the pipeline via an external feedback path. The pipelined has two paths which are selected based on the presence of other instructions in the pipeline. If no other instructions are in the pipeline a first path is taken which uses the external feedback path from the rounding unit back into the top of the dataflow. When there are instructions in the pipeline a shifter unit performing normalization of the fraction indicates possible underflow of the exponent, and prepares to hold the exponent and the fraction in a floating point data flow register; and upon detection of exponent underflow during the rounder stage and detection of any other instructions in pipeline; then the control unit forces an interrupt for serialization, and cancels execution of this instruction and other instructions in pipeline.

14 Claims, 1 Drawing Sheet

METHOD AND SYSTEM FOR EXECUTING DENORMALIZED NUMBERS

FIELD OF THE INVENTION

This invention relates to computer systems that execute floating point instructions, and particularly to a method and system for processing instructions in a floating point unit for executing denormalized numbers in floating point pipeline via serializing.

BACKGROUND OF THE INVENTION

The IEEE standard for floating point execution is IEEE standard 754 adopted in the mid 1980s and used since that time. However, for floating point units (which may be part of a chip or a separate chip or other functional module of the computer system) which desirably would pipeline execution of the IEEE 754's standard denormalized numbers there has been a problem all this time.

There are several methods for handling an intermediate result which needs to be denormalized. There are methods for software handling, hardware handling with an auxiliary unit, or hardware handling with expensive logic devoted to early detection. A lower cost method is needed with better performance than we think obtainable by software handling. The problem is that the detection of exponent underflow which could result in a denormalized number is not determined until late in the pipeline. To date there has been no satisfactory solution.

SUMMARY OF THE INVENTION

Our invention provides a floating point unit for a computer system having an instruction unit having a control unit and a pipelined data flow unit, a shifter and a rounding unit, and having an external feedback path for data from said rounding unit to an input of the pipelined data flow unit to reuse the pipeline for denormalization by passing intermediate results in the pipeline which have a denormalized condition computed after the exponent calculation of the shifting circuit directly from the rounding unit to the top of the dataflow in the pipeline via an external feedback path. The pipelined dataflow has two paths which are selected based on the presence of other instructions in the floating point pipeline, and wherein if there are no other instructions in the pipeline a first path is taken which uses the external feedback path from the rounding unit back into the top of the dataflow. When there are instructions in the pipeline: a shifter unit indicates possible underflow, and prepares to hold the exponent and any fraction in a floating point data flow register; and upon detection of exponent underflow in the control unit and detection of any other instructions in the pipeline; then the control unit forces an interrupt for serialization, and cancels execution of this instruction and other instructions in pipeline.

The improvements which we have made achieve reuse of the dataflow pipeline and thus hardware cost, and does not require any separate prior detection or any additional shifter, as our preferred embodiment does not detect underflow until the shifter unit has completed normalization. Our reuse of the dataflow pipeline provides better performance than we can envision executing in software.

These and other improvements are set forth in the following detailed description. For a better understanding of the invention with advantages and features, refer to the description and to the drawings.

Figure 1:
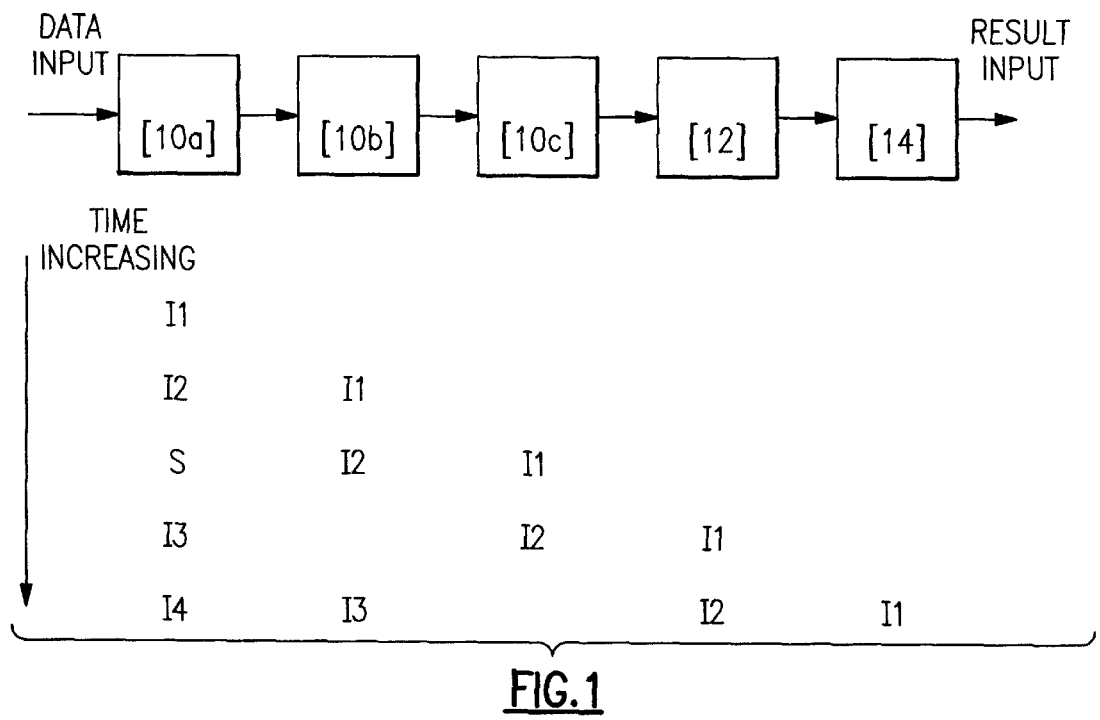
FIG. 1 is an example of instruction pipelining.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

Our detailed description explains the preferred embodiments of our invention, together with advantages and features, by way of example with reference to the following drawings.

DETAILED DESCRIPTION OF THE INVENTION

Before considering our preferred embodiments in detail, the IEEE 754 standard specifies a floating point data format which is commonly implemented in computer hardware. The format consists of a sign, a characteristic, and a mantissa. The sign bit is one bit and is represented by an "S", the characteristic is 8 bits for single format and 11 bits for double format and is represented by a "C", and the manitissa is 24 bits for single format and 53 bits for double format in which the most significant bit is implied and lesser significant bits are fractional bits and are represented by an "F" in equation [1] and [2] below. The bias of the exponent is equal to 127 for short and 1023 for long. If the characteristic is not equal to zero or the maximum value of all bits equal to one, then the value of the number is given by the following equation:

$$(-1)^{**}S * (1).F * 2^{**}(C-bias) \qquad [1]$$

Numbers within this range are called normalized numbers and they have an implied one in the mantissa.

There are four types of special numbers in the standard and they are represented by a characteristic equal to zero or all bits equal to one. Three of these special numbers are easy to handle in hardware since their value dictates the value of the result with little or no arithmetic computation. These three special numbers are zero, infinity, and not-a-number. The fourth special number is a denormalized number which is indicated by a characteristic equal to zero and a non-zero fraction. Its value is given by the following equation:

$$(-1)^{**}S * (0).F * 2^{**}(1-bias) \qquad [2]$$

Note that there is no implied one in this format and the characteristic and exponent do not vary. Denormalized numbers are particularly difficult to implement in a floating point unit without the assistance of software. Denormalized numbers are not normalized and have a fixed exponent value equal to (1-bias). If it is determined that a normalized intermediate result needs to be represented in a denormalized format, then the mantissa must be right shifted. Detection of denormalized result is not until late in a floating point unit's pipeline. The right shifting for denormalization should be performed prior to rounding in order to apply the rounding to the correct precision.

A floating point unit typically consists of several pipeline stages such as multiple pipeline stages for arithmetic computation (addition or multiplication), a normalization stage, and a rounding stage. Each pipeline stage may contain a separate instruction and the stages are connected in an ordered manner. If an instruction requires the use of an early stage in the pipeline that it already has executed in, this may not be allowable due to a resource conflict with a latter instruction. These paths are called internal feedback paths and they degrade the performance of the pipeline of floating point instructions. Additionally a protocol is required for controlling the resource conflicts of feedback paths. Denormalized results cause a problem due to the late detection that denormalization is required, and then there may be a feedback to an early pipeline stage which causes resource conflicts.

There are other ways that we will describe of addressing the problem with the pipelined execution of IEEE standard denormalized numbers by earlier detection of exponent underflow which could result in a denormalized number are not satisfactory.

To denormalize an intermediate result requires a right shift of the fraction. There are shifters in the typical floating point unit, but they are usually located in the same on a later stage of the pipeline as the determination of exponent underflow. Due to the implementation of a high performance pipeline, there may be a second instruction already in the shifter stage of the pipeline when the determination is made on the first instruction. Thus, it is difficult to maintain a pipeline of instructions in the floating point unit given the possibility of denormalizing the intermediate result.

Adding software or millicode to perform the denormalization of numbers, or have added a significant amount of hardware to predict exponent underflow and perform the right shifting the first time through which requires additional logic for leading zero anticipation and then using this information to predetermine the results exponent prior to reaching the normalization stage in the pipeline. If a software solution is used it will require many more cycles of execution. If the hardware solution of predetermining the result exponent prior to normalization is implemented, it will require a large amount of area for an infrequent case. Our solution achieves necessary performance with some small amount of control logic which we describe and provides the necessary performance and reduction of the number of cycles of execution of an instruction requiring denormalization.

FIG. 1 illustrates the pipelining of execution of instructions. It illustrates the flow of instruction through different stages 10a–14. This illustration illustrates how to finish off a binary result, where stage 10a represents the first of three parts of the arithmetic computation of an intermediate result which is completed by steps 10b and 10c and then step 12 represents taking the intermediate result computed by step 10c and normalizing it. That result is passed to stage 14 which rounds the intermediate result into a machine representation of the final result.

At each stage, a machine cycle is assumed to be complete, so increasing time is shown proceeding down the graph. I1, I2, I3, I4 illustrate separate instructions in the pipeline. "S" indicates a stall cycle. We thus illustrate that when you actually detect the normalized result in stage 14 there can be other instructions in the pipeline.

Figure 2:
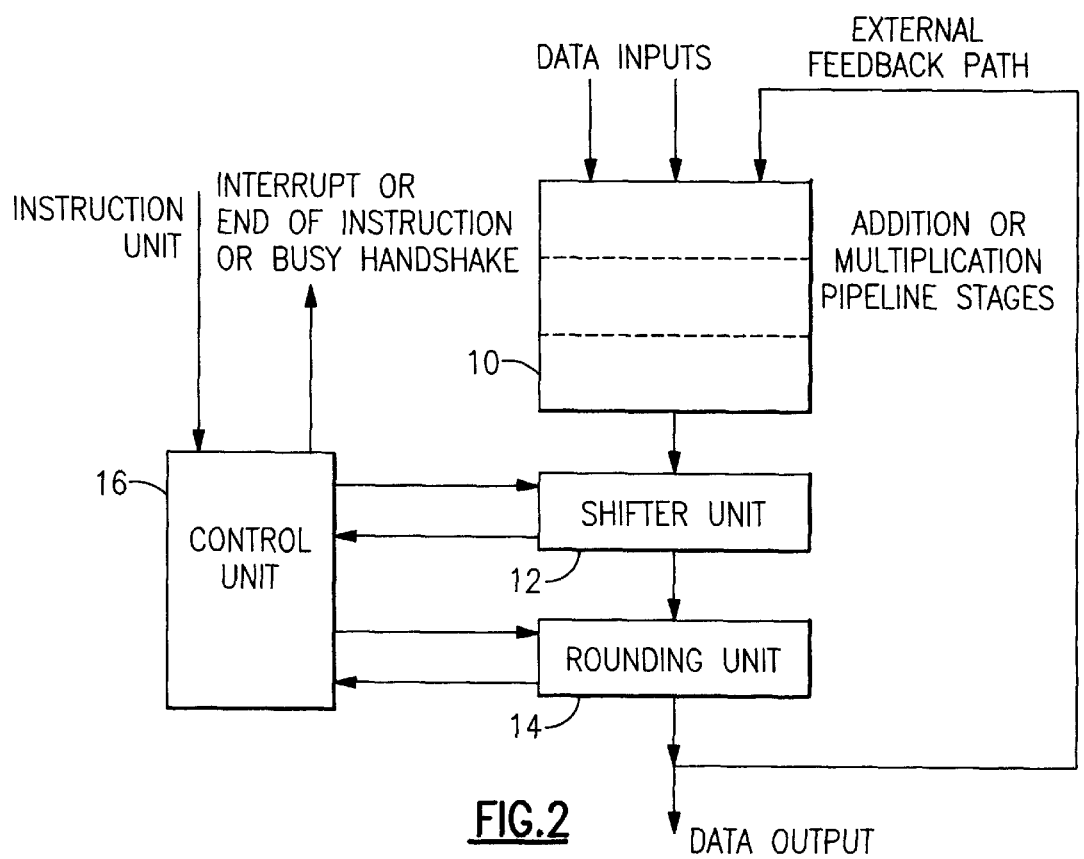
FIG. 2 shows schematically an overview of the preferred embodiment's floating point unit dataflow.

Now turning to FIG. 2, illustrating the floating point unit's dataflow, instructions are received into control unit 16. Data is received into the first of a set of pipeline stages 10, and data is outputted from the rounding unit 14 (the same as the final result of stage 14).

The control unit accepts instructions by handshaking with a instruction unit sending instructions to the control unit 14. The instruction unit for instance will issue instructions when the control unit's busy handshake signal is inactive, and the interrupt signal is inactive. The instruction unit also keeps track of which instructions are in the execution phase and when an instruction has completed execution the floating point control unit sends an end of instruction signal to the instruction unit. When an interrupt is issued all instructions that have not ended are cancelled and refetched by the instruction unit. For one specific interrupt type, a serialization interrupt, the instruction unit will issue the next instruction in a slow mode. The slow mode is when one instruction is issued and the next instruction is delayed until the first one's end of instruction.

The data is input into pipeline stage 10a, which can consist of many pipeline stages or just one, to produce the intermediate result such as addition or multiplication which is the result of the arithmetic computations illustrated by 10a–10c of FIG. 1. Then this intermediate result is normalized by the shifter 12 before passing to the rounding unit 14. The exponent calculation in the shifter unit is fed back to the control unit to detect if there is a denormalized result needed. This calculation is done in the rounding unit's pipeline stage. There is an external feedback path from the rounding unit to the pipeline stage 10a. This is used for data dependencies between instructions and also for denormalizing the intermediate result.

There are two control paths illustrated, one to the shifter unit 12 and one to the rounding unit 14. The control unit can cause the the shifter to either normalize an operand or to shift it by a specific amount which could result in denormalization depending upon the shift. The control signal to the rounding unit allows the selection of either rounding an operand or forcing trucation of the operand.

The present invention has two paths which are selected based on the presence of other instructions in the floating point unit pipeline. If there are no other instructions in the floating point unit pipeline then Path 1 is taken, else Path 2 is taken. Path 1 uses the external feedback path from the last stage of the floating point pipeline back into the shifter stage.

The shifter stage is used to right shift the fraction until the exponent is equal to the fixed exponent of the denormalized format. Thus the steps employed in the process used in path 1 when there are no instructions in the pipeline are: 1) Shifter unit indicates possible underflow during normalization, the control unit prepares to hold the exponent and fraction in the shifter unit output register; and 2) upon detection of exponent underflow in the rounder stage, the control unit sets up to force truncation in the rounder unit; and 3) truncates the fraction and passes the fraction and the exponent to the rounder unit output register; and then 4) passes the fraction to one of the input registers to the arithmetic pipeline stage 10a and the exponent to control unit; and then 5) moves the fraction through the pipeline stages 10a–c without altering it and passes it to the pipeline stage 10c output register; and then 6) forces unshifting of fraction in the shifter unit, and then 7) rounds the denormalized fraction and forces the characteristic to all zero, and finally 8) write the denormalized result to the floating point registers (FPRs).

Path 2 consists of a causing a "serialization interrupt". Hardware causes an interrupt which clears the floating point unit pipeline of outstanding instructions including the instruction which requires denormalization. The interrupt is invoked after all instructions prior to the one requiring denormalization are executed. The "serialization" interrupt type causes the first reissued instruction to be executed in a slow mode which holds off the issuing of subsequent instructions until the first one has completed. This guarantees that when the Instruction is reissued it will be able to execute in Path 1. Note that in a multiple processor environment that another processor could alter the instruction or data which caused the intermediate result to require denormalization. Since both the instruction and data are refetched from memory, this presents no problem to cache coherency. The other processor will have been assumed to execute first. It is acceptable to cancel and refetch an instruction as long as no machine state is altered on the first execution. If the intermediate result were stored away this could present a problem in a multiprocessor environment. Thus, when path 2 is used, the following steps occur: when there are instructions in the pipeline: 1 Shifter unit indicates possible underflow during normalization, and prepares to hold the exponent and the fraction in the shifter unit output register, a floating point data flow register; and 2 upon detection of exponent underflow in the control unit during the rounder stage, and detection of any other instruction in the pipeline; then the control unit 3) forces an interrupt for serialization, and cancels execution of this instruction and other instructions in pipeline.

The proposed method uses the external feedback path to reuse the shifter unit to perform the denormalization of the intermediate result. This eliminates the need for an extra shifter. Also, the detection of the need to denormalize an intermediate result is accomplished by post detection of the exponent after normalization. This eliminates the need to perform leading zero anticipation which can require a large amount of area, so that the shift amount can be predicted in parallel with the normalization. To alleviate the complexity of controlling resource conflicts, a simple protocol is specified. The protocol only allows the feedback path to be used if there are no other instructions in the floating point pipeline currently executing other than the one that needs to be denormalized. The protocol forces the instruction to be reissued if there are other instructions in the floating point unit pipeline. A mechanism for forcing the instruction to be reissued without any overlapping execution with any other instruction is used to eliminate any resource conflicts. No knowledge of the prior intermediate results need to be maintained and are not maintained to avoid any cache coherency problems. In accordance with our invention when an instruction in the last stage of the pipeline is determined to require a denormalized result (exponent underflow is detected), a determination is made to see if there is any other instructions in the floating point unit pipeline. If there are no other instructions in the pipeline a busy handshake signal is sent to the Instruction Unit to prevent any new instructions from being accepted then the data is wrapped back through the pipeline and a forced right shift of the data is accomplished in the shifter unit. Then the data is rounded and the result is written to the register file.

For the interesting case of another instruction concurrently executing in the floating point unit (FPU) pipeline, a serialization interrupt is taken. The control unit 14 signals the serialization interrupt to the instruction unit. All the outstanding instructions are cancelled. The instruction unit reissues the instruction requiring denormalization and waits for its end of instruction prior to issuing a subsequent seqential instruction. Thus, both the instruction which needed to denormalize the result and any other subsequent instructions in the FPU pipeline are cancelled. The instructions are re-fetched and the first instruction is executed in a serialization mode which causes the second instruction to not be issued until an end of execution signal is received for the first instruction. After the second instruction is issued the serialization mode ends and a pipeline of instructions is reestablished.

Since the instruction which needs a denormalized result (exponent underflow) is reissued in serialization mode, it is guaranteed that there will be no other instructions in the pipeline during its execution. And, it will be able to wrap back through the pipeline and complete. Nothing is saved between executions of this instruction, thus if the data is changed by another processor and does not require denormalization it will not cause any problems. Also, deadlock will not occur because the instruction is guaranteed to be executable the second time issued, because it is executed in a serialization mode.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A method of processing instructions in a floating point unit having an instruction unit for processing a plurality of instructions which may be issued which could conflict with wrapping back of an instruction which requires denormalization, said instruction unit having a control unit, a pipelined data flow unit, a shifter and a rounding unit for sequential processing of pipelined data, and being provided with an external feedback path for data from said rounding unit to the pipelined data flow unit, comprising the steps of:

detecting by examination of pipelined dataflow the need to denormalize an intermediate result by post detection of an exponent after normalization by said shifter, and also detecting of the presence of any other instructions in the floating point pipelined dataflow, and providing said intermediate result data for denormalization via said external feedback path from said rounding unit to an input of said pipelined data flow unit and enabling said shifter and said rounding unit to reuse the shifter to perform the denormalization of the intermediate result and then rounding the denormalized result in said rounding unit.

2. A method of processing instructions in a floating point unit, according to claim 1, wherein when said control unit has detected that there are no other instructions in the floating point pipeline currently executing other than a one that needs to be denormalized, said intermediate result is fed back through the external feedback path from said rounding unit to reuse said shifter and said rounding unit to perform the denormalization of the intermediate result by said reuse of the shifter to perform the denormalization of the intermediate result and then rounding the denormalized result in said rounding unit.

3. A method of processing instructions in a floating point unit, according to claim 1, wherein if there are more than one instruction in the pipeline, then a serialization interrupt is forced by said control unit which forces the instruction to be reissued without any overlapping execution with any other instruction.

4. A method of processing instructions in a floating point unit, according to claim 1, wherein the process includes the steps of determining when an instruction in the last stage of the pipeline of the examined pipelined dataflow requires a denormalized result, and making a determination to see if there is any other instructions in the floating point unit pipeline, and if there are no other instructions in the pipeline, sending a busy handshake signal to the instruction unit to prevent any new instructions from being accepted, then wrapping back data which requires a denormalized result through the pipeline via said external feedback path to take a first path through the pipeline unit.

5. A method of processing instructions in a floating point unit, according to claim 1, wherein said detecting of the need to denormalize an intermediate result occurs after performing with said shifter an exponent calculation.

6. A method of processing instructions in a floating point unit, according to claim 5, wherein said pipelined data flow unit has two paths which are selected based on said detecting of the presence of other instructions in the floating point pipelined dataflow, and wherein if there are no other instructions in the floating point pipelined dataflow a first path is selected and taken which uses the external feedback path from the rounding unit back into the top of the floating point pipelined dataflow.

7. A method of processing instructions in a floating point unit, according to claim 6, wherein upon detection of an exponent underflow in the floating point pipelined dataflow and of other instructions in the pipeline, a second path is selected and taken via a second path which provides a serialization mechanism for canceling all issued instructions which have not completed execution and for reissuing them with the first instruction executed without overlap.

8. A method of processing instructions in a floating point unit, according to claim 7, wherein said first path does not require any interrupt action to maintain performance, whereas said second path is only invoked when there is a resource conflict.

9. A method of processing instructions in a floating point unit, according to claim 8, wherein steps employed in the process used in path one when there are no instructions in the pipeline include:

a) when said shifter performing normalization indicates possible underflow, the control unit prepares to hold the exponent and fraction in a floating point data flow register; and b) upon detection of an exponent underflow in the control unit, the control unit sets up to force truncation in the rounder; and c) truncates the fraction and passes the fraction and exponent to the rounding unit output register; and then d) passes the fraction to a input register to the pipelined dataflow and the exponent to the control unit; and then e) moves the fraction to another floating point data flow register; and then f) forces shifting of fraction in the shifter unit, and then g) rounds the denormalized fraction and forces the characteristic to all zero, and finally h) writes the denormalized result to the floating point registers (FPRs).

10. A method of processing instructions in a floating point unit, according to claim 8, wherein when said second path is used, the following steps are processed when there are instructions in the pipeline:

a) when said shifter while performing normalization indicates a possible exponent underflow, and prepares to hold the exponent and the fraction in a floating point data flow register; and b) said control unit, upon detection of said exponent underflow in the rounder stage, also detects any other instruction in the pipeline; then the control unit c) forces an interrupt for serialization, and cancels execution of this instruction and other instructions in pipeline.

11. A floating point unit for a computer system comprising:

an instruction unit for processing a plurality of instructions which may be issued which could conflict with wrapping back of an instruction which requires denormalization, said instruction unit having a control unit and a pipelined data flow unit, a shifter and a rounding unit, and having an external feedback path for data from said rounding unit to an input of said pipelined data flow unit, said pipelined data flow unit receiving intermediate results requiring denormalization directly from said rounding unit via said external feedback path by selection with said control unit being provided with a mechanism for detection of the need to denormalize an intermediate result by post detection of an exponent after normalization by said shifter, and also detection of the presence of other instructions in the pipeline, and wherein said external feedback path for data from said rounding unit to the pipelined data flow unit enables said shifter and said rounding unit to reuse the shifter to perform the denormalization of the intermediate result and then rounding the denormalized result in said rounding unit.

12. A floating point unit for a computer system according to claim 11 wherein said pipelined data flow unit has two paths for dataflow which are selected by said control unit based on the detection of the presence of other instructions in the floating point pipeline, and wherein if there are no other instructions in the pipeline a first path of said two paths is selected and taken which uses said external feedback path from the rounding unit back into the top of the dataflow.

13. A floating point unit for a computer system according to claim 12 upon detection of an exponent underflow in the floating point pipelined dataflow and of other instructions in the pipeline, a second path of said two paths is selected and taken via a second path which provides a serialization mechanism for canceling all issued instructions which have not completed execution and for reissuing them with the first instruction executed without overlap.

14. A floating point unit for a computer system according to claim 12 said first path does not require any interrupt action to maintain performance, whereas said second path is only invoked when there is a resource conflict.

* * * * *